US011146107B2

(12) United States Patent
Wang et al.

(10) Patent No.: US 11,146,107 B2
(45) Date of Patent: Oct. 12, 2021

(54) WIRELESS POWERING DEVICE AND ELECTRICAL APPARATUS

(71) Applicant: Tyco Electronics (Shanghai) Co. Ltd., Shanghai (CN)

(72) Inventors: Shaoyong Wang, Shanghai (CN); Yuming Song, Shanghai (CN); Feng Dai, Shanghai (CN)

(73) Assignee: Tyco Electronics (Shanghai) Co. Ltd., Shanghai (CN)

(*) Notice: Subject to any disclaimer, the term of this patent is extended or adjusted under 35 U.S.C. 154(b) by 338 days.

(21) Appl. No.: 16/153,938

(22) Filed: Oct. 8, 2018

(65) Prior Publication Data
US 2019/0044382 A1 Feb. 7, 2019

Related U.S. Application Data

(63) Continuation of application No. PCT/IB2017/051892, filed on Apr. 3, 2017.

(30) Foreign Application Priority Data

Apr. 8, 2016 (CN) .......................... 201610216343.0

(51) Int. Cl.
*H02J 50/10* (2016.01)
*H01F 38/14* (2006.01)
(Continued)

(52) U.S. Cl.
CPC .............. *H02J 50/10* (2016.02); *B60L 5/005* (2013.01); *B60M 7/00* (2013.01);
(Continued)

(58) Field of Classification Search
CPC ....... B60L 5/005; B60M 7/00; H01F 27/2823; H01F 27/306; H01F 38/14; H01F 5/00
(Continued)

(56) References Cited

U.S. PATENT DOCUMENTS 5,737,211 A * 4/1998 Hirai ....................... H01F 38/14
363/144
6,931,304 B1 8/2005 Miller et al.
(Continued)

FOREIGN PATENT DOCUMENTS

DE 10 2011 018 633 A1 10/2012
DE 102011018633 A 11/2015
(Continued)

OTHER PUBLICATIONS

PCT Written Opinion of the International Searching Authority and the Written Opinion, dated Jun. 8, 2017, 12 pages.
Abstract of DE 102011018633, dated Oct. 25, 2012, 1 page.

*Primary Examiner* — Alfonso Perez Borroto
(74) *Attorney, Agent, or Firm* — Barley Snyder

(57) ABSTRACT

A wireless powering device comprising a first coil assembly including a first coil and a second coil assembly including a second coil. The second coil is adapted to be electromagnetically coupled with the first coil. One of the first coil and the second coil is used as a transmitting coil and another of the first coil and the second coil is used as a receiving coil. The second coil is movable with respect to the first coil in a direction perpendicular to a direction of magnetic lines generated by the transmitting coil.

19 Claims, 8 Drawing Sheets

(51) Int. Cl.
*B60L 5/00* (2006.01)
*B60M 7/00* (2006.01)
*H02J 50/90* (2016.01)
*H01F 27/28* (2006.01)
*H01F 27/30* (2006.01)

(52) U.S. Cl.
CPC ....... *H01F 27/2823* (2013.01); *H01F 27/306* (2013.01); *H01F 38/14* (2013.01); *H02J 50/90* (2016.02)

(58) Field of Classification Search
USPC ......................................................... 307/104
See application file for complete search history.

(56) References Cited

U.S. PATENT DOCUMENTS

| | | | | |
|---|---|---|---|---|
| 2008/0164876 | A1* | 7/2008 | Sakakura | G01R 33/3873 324/318 |
| 2008/0303479 | A1* | 12/2008 | Park | H02J 7/00304 320/108 |
| 2011/0006612 | A1* | 1/2011 | Kozakai | H02J 7/00034 307/104 |
| 2011/0053500 | A1* | 3/2011 | Menegoli | H02J 50/20 455/41.1 |
| 2012/0032632 | A1* | 2/2012 | Soar | H02J 50/70 320/108 |
| 2013/0084157 | A1* | 4/2013 | Staunton | B65G 35/06 414/752.1 |
| 2014/0084699 | A1* | 3/2014 | Sugino | H01F 38/14 307/104 |
| 2015/0380950 | A1 | 12/2015 | Ogasawara et al. | |
| 2017/0069422 | A1 | 3/2017 | Wang et al. | |

FOREIGN PATENT DOCUMENTS

| | | | | |
|---|---|---|---|---|
| EP | 2688078 | A1 * | 1/2014 | ............. H01F 38/14 |
| JP | 2009060762 | | * 3/2009 | |

* cited by examiner

WIRELESS POWERING DEVICE AND ELECTRICAL APPARATUS

CROSS-REFERENCE TO RELATED APPLICATIONS

This application is a continuation of PCT International Application No. PCT/IB2017/051892, filed on Apr. 3, 2017, which claims priority under 35 U.S.C. § 119 to Chinese Patent Application No. 201610216343.0, filed on Apr. 8, 2016.

FIELD OF THE INVENTION

The present invention relates to a powering device and, more particularly, to a wireless powering device.

BACKGROUND

In an electrical apparatus, power required by control and driving components of the apparatus is primarily obtained through external wiring or a built-in battery. Power transmission inside the electrical apparatus is accomplished through power lines in physical connection. Power lines within moving areas of moving components, however, are likely subjected to physical wear, resulting in some issues of safety, diminished equipment life, and increased maintenance. For this reason, some electrical apparatus use wireless, non-contact transmission of power achieved through coupling coil groups.

A wireless power transmission device generally comprises a transmitting coil and a receiving coil coupled to the transmitting coil. A coil mounted on a moving component of the electric apparatus moves relative to another coil mounted on a stationary component of the electric apparatus generally in the direction of the magnetic lines generated by the transmitting coil. As the moving component moves, the distance between the transmitting coil and the receiving coil in the direction of the magnetic lines gradually increases. Thus, when the moving distance of one coil mounted on the moving component relative to the other coil is large, the magnetic flux passing through the receiving coil is drastically reduced, and stable electromagnetic coupling between the transmitting coil and the receiving coil may not be sufficiently ensured to wirelessly transmit power.

In wireless power transmission, to ensure stable electromagnetic coupling, the distance between the transmitting coil and the receiving coil should be designed not to be larger than the diameter of the transmitting coil or the receiving coil. However, in some applications, the moving distance of the moving component must be rather large, reaching up to a level of tens of centimeters. For example, a front wind shield of a cabinet air-conditioner may move relative to the body of the air conditioner by tens of centimeters. In such an application case, the transmitting and receiving coils of a conventional wireless power transmission device are not capable of reliably wirelessly transmitting power.

SUMMARY

A wireless powering device comprising a first coil assembly including a first coil and a second coil assembly including a second coil. The second coil is adapted to be electromagnetically coupled with the first coil. One of the first coil and the second coil is used as a transmitting coil and another of the first coil and the second coil is used as a receiving coil. The second coil is movable with respect to the first coil in a direction perpendicular to a direction of magnetic lines generated by the transmitting coil.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
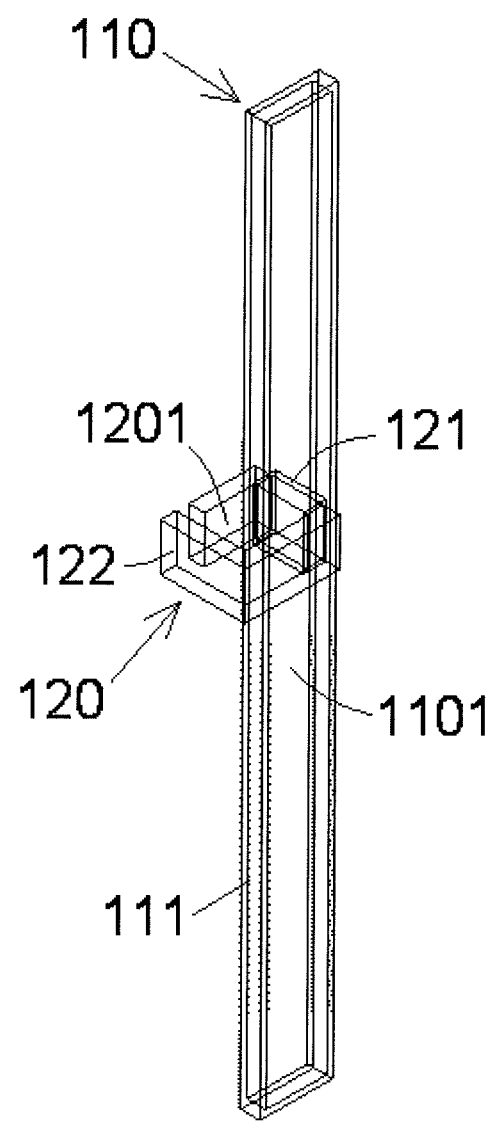
FIG. 1 is a perspective view of a wireless powering device according to an embodiment.

Exemplary embodiments of the present disclosure will be described hereinafter in detail with reference to the attached drawings, wherein like reference numerals refer to the like elements. The present disclosure may, however, be embodied in many different forms and should not be construed as being limited to the embodiments set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
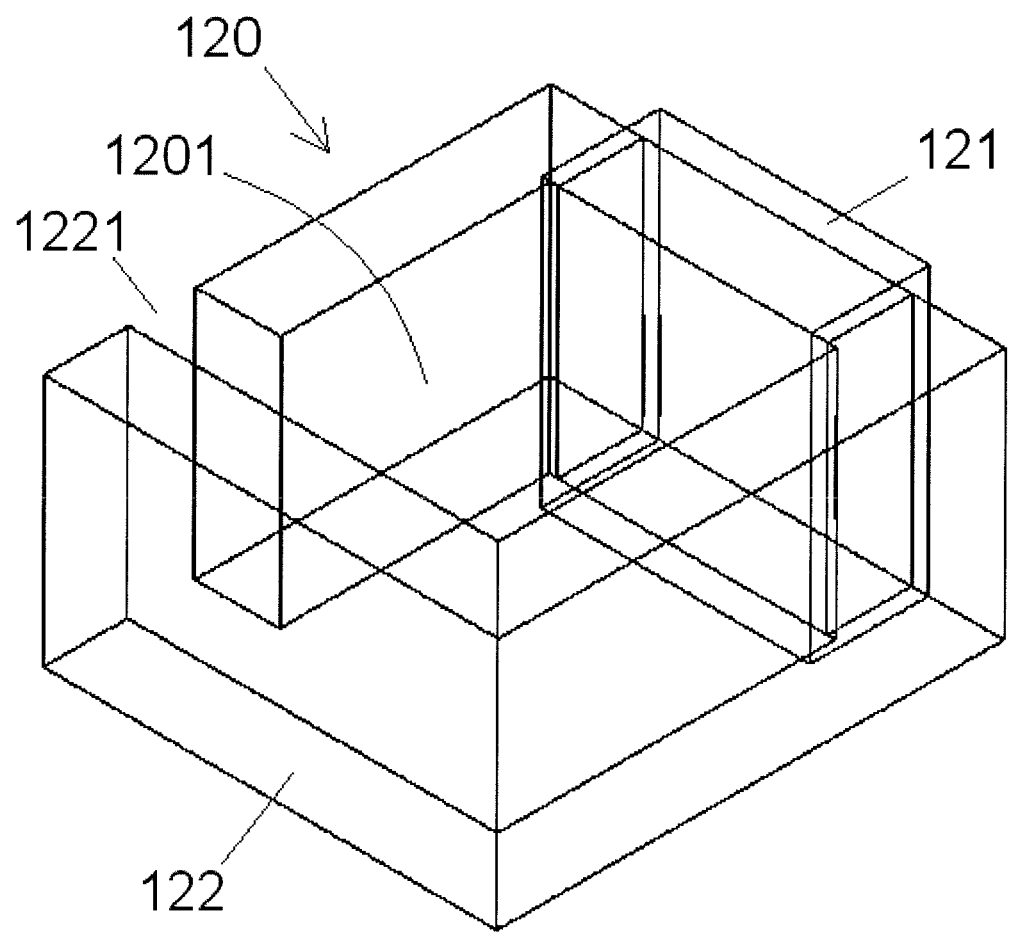
FIG. 2 is a perspective view of a receiving coil assembly of the wireless power device of FIG. 1.
Figure 3:
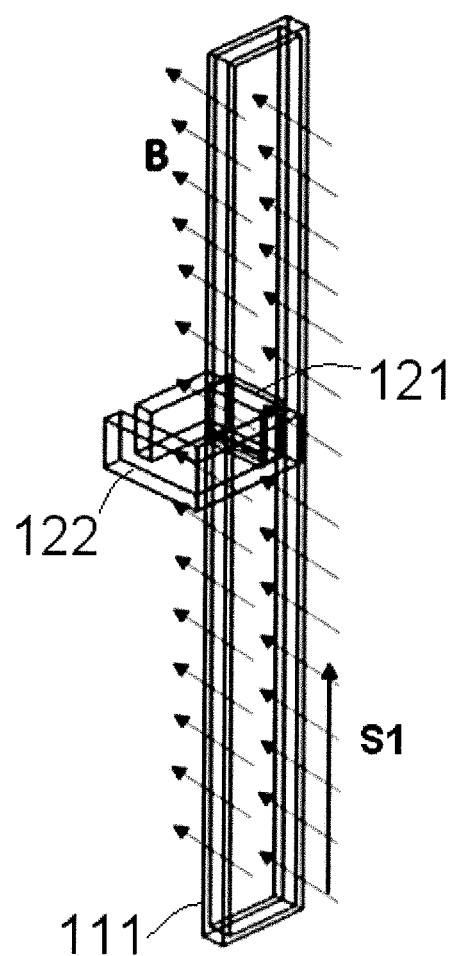
FIG. 3 is a perspective view of the wireless powering device of FIG. 1 with a direction of magnetic lines generated by a transmitting coil and a movement direction of a receiving coil.

A wireless powering device according to an embodiment of the invention, as shown in FIGS. 1-3, comprises a first coil assembly 110 including a first coil 111 and a second coil assembly 120 including a second coil 121 adapted to be electromagnetically coupled with the first coil 111. In various embodiments, one of the first coil 111 and the second coil 121 is used as a transmitting coil and the other of the first coil 111 and the second coil 121 is used as a receiving coil; in the shown embodiment, the first coil 111 is used as the transmitting coil and the second coil 121 is used as the receiving coil.

The first coil assembly 110 is adapted to be mounted on a first carrier of an electrical apparatus and the second coil assembly 120 is adapted to be mounted on a second carrier of the electrical apparatus. In an embodiment, the second carrier is a moving component, such as a moving door, and the first carrier is a stationary component, such as an unmovable housing, of the electrical apparatus. The second carrier is movable with respect to the first carrier.

As shown in FIG. 3, when the second carrier is moved with respect to the first carrier, the second coil 121 is moved relative to the first coil 111 in a direction S1 perpendicular to a direction B of magnetic lines generated by the transmitting coil 111. Thereby, the distance between the transmitting coil 111 and the receiving coil 121 in the direction B of the magnetic lines remains constant during movement of the second carrier with respect to the first carrier. Therefore, the electromagnetic coupling intensity between the transmitting coil 111 and the receiving coil 121 does not decrease as the moving distance of the second carrier increases, so that the electromagnetic coupling intensity between the transmitting coil 111 and the receiving coil 121 is maintained, achieving stable wireless power transmission even in a case where the moving component is moved a large distance. When the second carrier is moved with respect to the first carrier, that is, when the second coil 121 is moved relative to the first coil 111, a central axis of the receiving coil 121 is parallel to the direction B of the magnetic lines generated by the transmitting coil 111, such that the magnetic flux area of the receiving coil 121 is maintained largest.

The second coil assembly 120, as shown in FIGS. 1-3, includes a magnetic core 122, which has a rectangular frame with an opening 1221. The second coil 121 is wound around a side wall of the magnetic core 122. The first coil 111 has a rectangular frame. A side wall of the first coil 111 is introduced into an inner space of the magnetic core 122 via the opening 1221, and the second coil 121 is disposed in an inner space 1101 of the first coil 111. Because the first coil 111 has a rectangular frame, the second coil 121 is movable relative to the first coil 111 in the first direction S1 parallel to the longitudinal direction of the first coil 111, as shown in FIG. 3. In other embodiments, the first coil 111 may also have other suitable shapes, such as, a circular shape, a Z-shape, a L-shape, or the like.

In an embodiment, the length of the first coil 111 (the transmitting coil) may be much larger than the length of the second coil 121 (the receiving coil), such that a single transmitting coil 111 may be electromagnetically coupled to a plurality of receiving coils 121, and power may be supplied to a plurality of loads connected to the plurality of receiving coils 121 through the single transmitting coil 111.

In another embodiment, an electrical apparatus comprises the above described wireless powering device, the first carrier on which the first coil assembly 110 of the wireless powering device is mounted, and the second carrier on which the second coil assembly 120 of the wireless powering device is mounted. When the second carrier is moved relative to the first carrier, the second coil 121 is moved relative to the first coil 111 in a direction S1 perpendicular to the direction B of magnetic lines generated by the first coil 111. The electrical apparatus, in various embodiments, may be any type of electrical apparatus, such as a refrigerator, a washer, an air conditioner, or the like.

Figure 4:
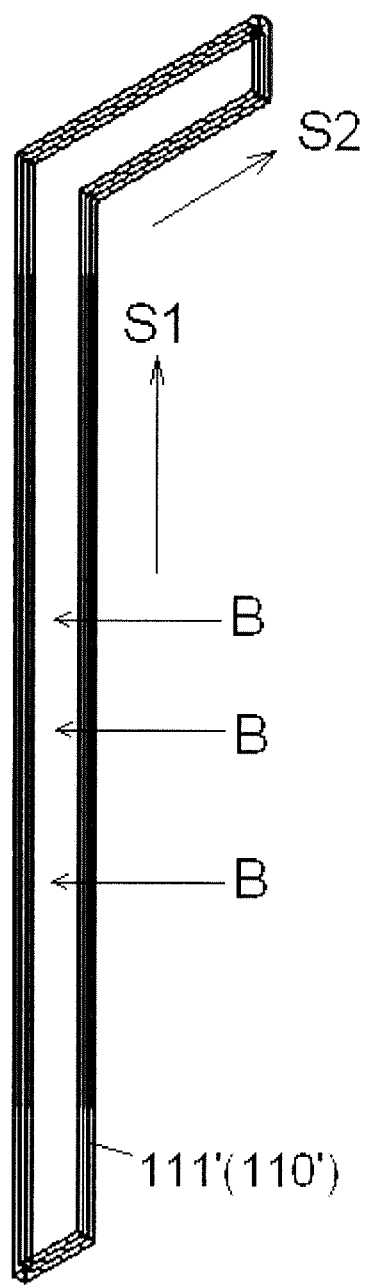
FIG. 4 is a perspective view of a transmitting coil according to another embodiment.

A transmitting coil 111' according to another embodiment, as shown in FIG. 4, is formed as a L-shaped or inverted L-shaped frame, and includes a first portion extending in a first direction S1 and a second portion extending in a second direction S2 generally perpendicular to the first direction S1. The second coil 121 shown in FIG. 2 is movable relative to the first coil 111' shown in FIG. 4 in the first direction S1 or the second direction S2.

Figure 5:
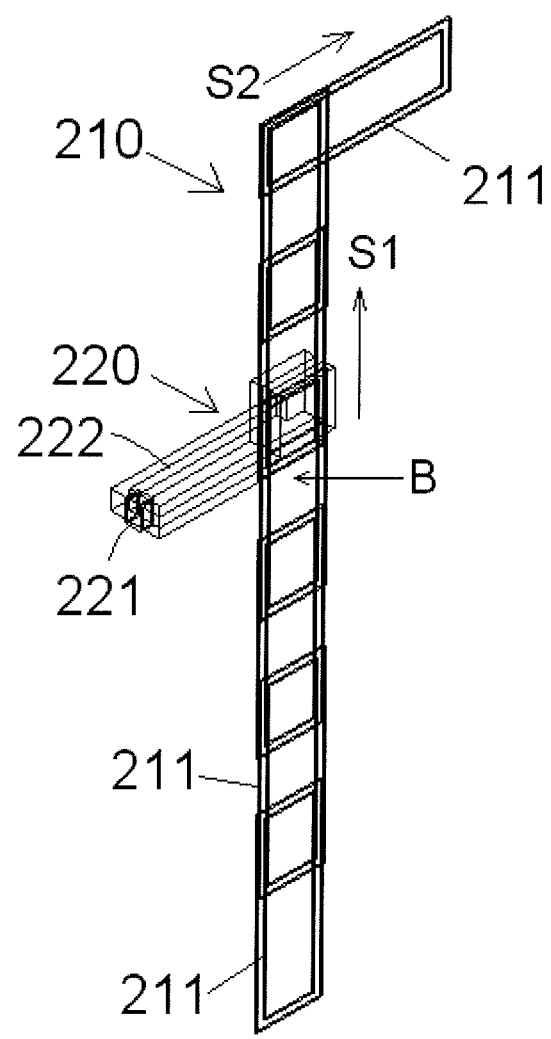
FIG. 5 is a perspective view of a wireless powering device according to another embodiment.
Figure 6:
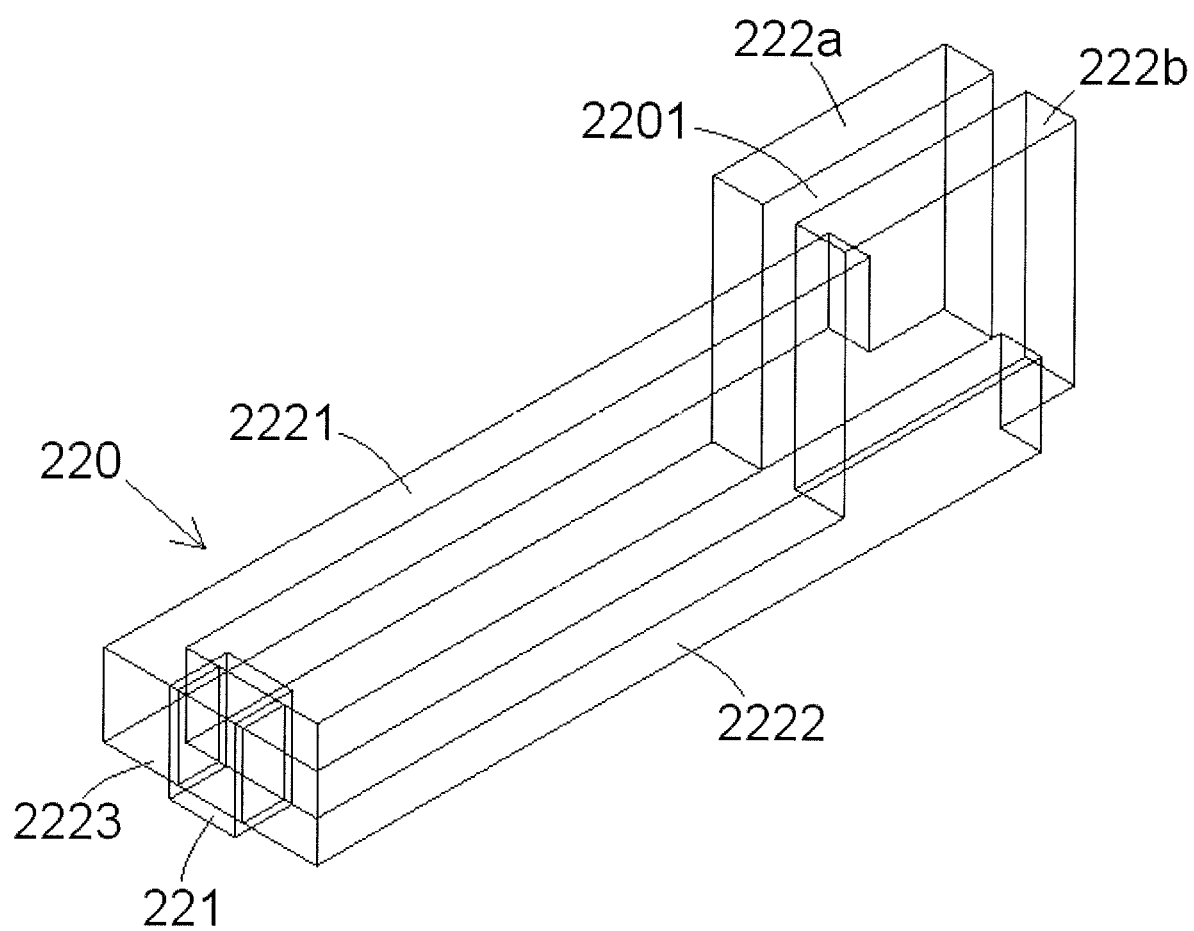
FIG. 6 is a perspective view of a receiving coil assembly of the wireless powering device of FIG. 5.

A wireless powering device according to another embodiment, as shown in FIGS. 5 and 6, comprises a first coil assembly 210 including a first coil 211 and a second coil assembly 220 including a second coil 221 adapted to be electromagnetically coupled with the first coil 211. In various embodiments, one of the first coil 211 and the second coil 221 is used as a transmitting coil and the other of the first coil 211 and the second coil 221 is used as a receiving coil; in the shown embodiment, the first coil 211 is used as the transmitting coil and the second coil 221 is used as the receiving coil.

The first coil assembly 210 is adapted to be mounted on a first carrier of an electrical apparatus and the second coil assembly 220 is adapted to be mounted on a second carrier of the electrical apparatus. In an embodiment, the second carrier is a moving component, such as a moving door, and the first carrier is a stationary component, such as an unmovable housing, of the electrical apparatus. The second carrier is movable with respect to the first carrier.

As shown in FIG. 5, when the second carrier is moved with respect to the first carrier, the second coil 221 is moved relative to the first coil 211 in a direction S1 perpendicular to a direction B of magnetic lines generated by the transmitting coil. The distance between the transmitting coil 211 and the receiving coil 221 in the direction B of the magnetic lines remains constant during movement of the second carrier with respect to the first carrier. The electromagnetic coupling intensity between the transmitting coil 211 and the receiving coil 221 does not decrease as the moving distance of the second carrier increases, so that the electromagnetic coupling intensity between the transmitting coil 211 and the receiving coil 221 is maintained, achieving stable wireless power transmission even in a case where the moving component is moved a large distance. When the second carrier is moved with respect to the first carrier, that is, when the second coil 221 is moved relative to the first coil 211, a central axis of the receiving coil 221 is parallel to the direction B of the magnetic lines generated by the transmitting coil 211, such that the magnetic flux area of the receiving coil 221 is maintained largest.

The first coil assembly 210, as shown in FIGS. 5 and 6, includes a plurality of first coils 211 each having a rectangular shape. The plurality of first coils 211 form a coil array having a predetermined shape. The second coil assembly 220 includes a magnetic core 222 which is formed as a rectangular frame having an end opening 2201, the second coil 221 being wound on a side wall of the magnetic core 222. The coil array passes through the end opening 2201 of the magnetic core 222 such that the second coil assembly 220 is movable along the coil array having a predetermined shape.

The magnetic core 222, as shown in FIGS. 5 and 6, is formed as a rectangular frame and includes a pair of longitudinal side walls 2221 and 2222, an end side wall 2223 at a first end thereof, and a pair of flat plate portions 222a and 222b at a second end opposite the first end. The second coil 221 is wound around the end side wall 2223 of the magnetic core 222, and the end opening 2201 is located between the pair of flat plate portions 222a and 222b. The pair of flat plate portions 222a and 222b has a width wider than that of the other portions of the magnetic core 222 to increase a coupling area with the first coil 211.

The coil array including the plurality of the first coils 211, as shown in FIG. 5, is formed as L-shaped or inverted L-shaped, and includes a first portion extending in a first direction S1 and a second portion extending in a second direction S2 generally perpendicular to the first direction S1, such that the second coil 221 is movable relative to the first coil 211 in the first direction S1 or the second direction S2. As shown in FIG. 5, adjacent first coils 211 in the coil array are partially overlapped with each other to ensure a continuous transition between the first coils 211, so as to realize continuous and stable electromagnetic coupling between the second coil 221 and the first coil 211. In other embodiments, the coil array may also be formed in any other suitable shapes, such as a circular shape, a Z-shape, a rectangular shape, an L-shape, or the like.

In an embodiment, the wireless powering device further comprises a position sensor and a control device. The position sensor is adapted to detect the positions of the first coil 211 and the second coil 221 and the control device is adapted to control the turning on and turning off of the first coils 211. As shown in FIG. 5, during movement of the second coil 221 relative to the first coil 211, the control device turns on only one of the first coils 211 closest to the second coil 221 based on the position information detected by the position sensor, with the rest of the first coils 211 remaining off so as to save energy.

In an embodiment, the length of the first coil 211 (the transmitting coil) may be much larger than that of the second coil 221 (the receiving coil), such that a single transmitting coil 211 may be electromagnetically coupled to a plurality of receiving coils 221, and power may be supplied to a plurality of loads connected to the plurality of receiving coils 221 through the single transmitting coil 211.

In another embodiment, an electrical apparatus comprises the above described wireless powering device, the first carrier on which the first coil assembly 210 of the wireless powering device is mounted, and the second carrier on which the second coil assembly 220 of the wireless powering device is mounted. When the second carrier is moved relative to the first carrier, the second coil 221 is moved relative to the first coil 211 in a direction S1, S2 perpendicular to the direction B of magnetic lines generated by the first coil 211. The electrical apparatus, in various embodiments, may be any type of electrical apparatus, such as a refrigerator, a washer, an air conditioner, or the like.

Figure 7:
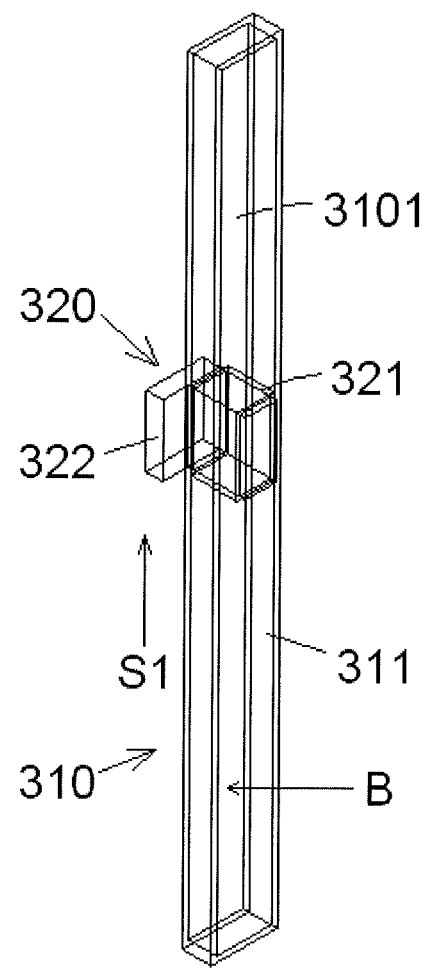
FIG. 7 is a perspective view of a wireless powering device according to another embodiment.
Figure 8:
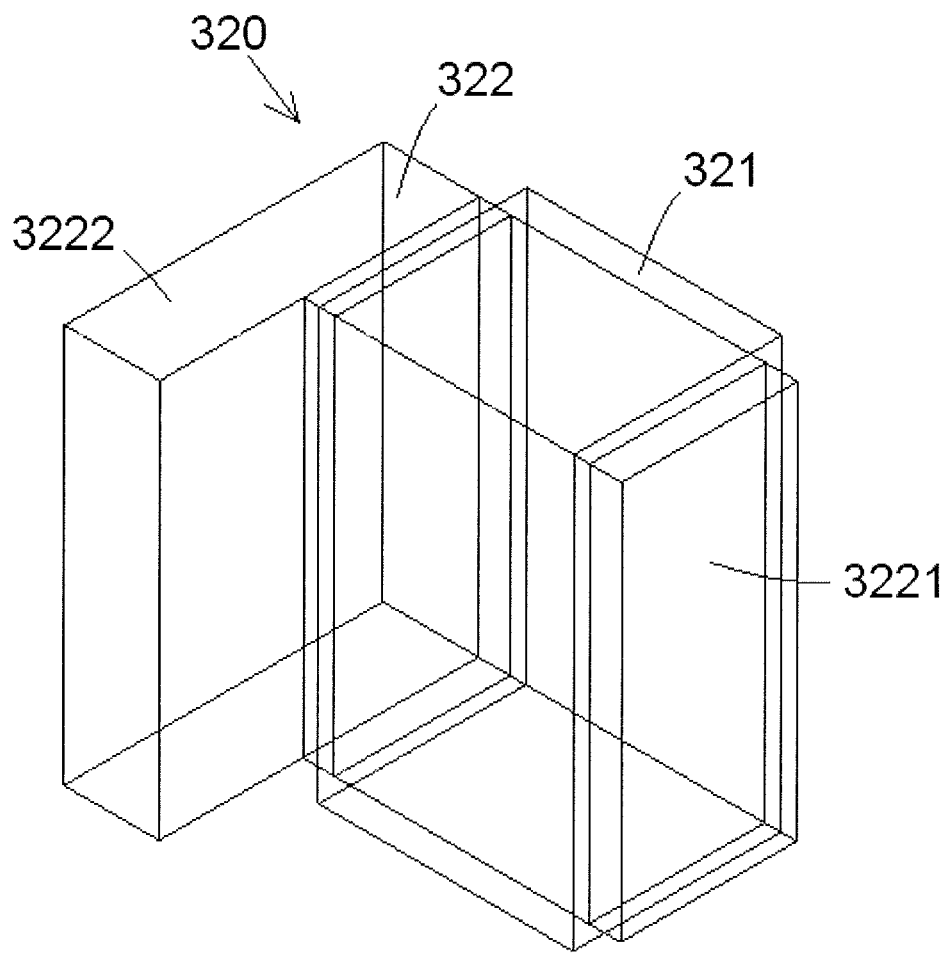
FIG. 8 is a perspective view of a receiving coil assembly of the wireless powering device of FIG. 7.

A wireless powering device according to another embodiment, as shown in FIGS. 7 and 8, comprises the first coil assembly 310 including a first coil 311 and the second coil assembly 320 including a second coil 321 adapted to be electromagnetically coupled with the first coil 311. One of the first coil 311 and the second coil 321 is used as a transmitting coil and the other of the first coil 311 and the second coil 321 is used as a receiving coil; in the shown embodiment, the first coil 311 is used as the transmitting coil and the second coil 321 is used as the receiving coil.

The first coil assembly 310 is adapted to be mounted on a first carrier of an electrical apparatus and the second coil assembly 320 is adapted to be mounted on a second carrier of the electrical apparatus. In an embodiment, the second carrier is a moving component, such as a moving door, and the first carrier is a stationary component, such as an unmovable housing, of the electrical apparatus. The second carrier is movable with respect to the first carrier.

As shown in FIG. 7, when the second carrier is moved with respect to the first carrier, the second coil 321 is moved relative to the first coil 311 in a direction S1 perpendicular to a direction B of magnetic lines generated by the transmitting coil. The distance between the transmitting coil 311 and the receiving coil 321 in the direction B of the magnetic lines remains constant during movement of the second carrier with respect to the first carrier. The electromagnetic coupling intensity between the transmitting coil 311 and the receiving coil 321 does not decrease as the moving distance of the second carrier increases, so that the electromagnetic coupling intensity between the transmitting coil 311 and the receiving coil 321 is maintained, achieving stable wireless power transmission even in a case where the moving component is moved a large distance. When the second carrier is moved with respect to the first carrier, that is, when the second coil 321 is moved relative to the first coil 311, a central axis of the receiving coil 321 is parallel to the direction B of the magnetic lines generated by the transmitting coil 311, such that the magnetic flux area of the receiving coil 321 is maintained largest.

The second coil assembly 320, as shown in FIGS. 7 and 8, includes a magnetic core 322 having an L-shape. The second coil 321 is wound on the magnetic core 322. The first coil 311 is formed as a frame having a predetermined shape, and the second coil 321 is disposed in an inner space 3101 of the first coil 311, so that the second coil 321 is movable relative to the first coil 311. As shown in FIG. 7, the first coil 311 is formed as a rectangular frame, such that the second coil 321 is movable relative to the first coil 311 in a first direction S1 parallel to a longitudinal direction of the first coil 311. In other embodiments, the first coil 311 may also be formed in any other suitable shape, such as a circular shape, a Z-shape, an L-shape, or the like.

In an embodiment of a wireless powering device incorporating the transmitting coil 111' shown in FIG. 4, the second coil 321 shown in FIG. 8 is movable relative to the first coil 111' shown in FIG. 4 in the first direction S1 or the second direction S2.

In an embodiment, the length of the first coil (the transmitting coil) 311 may be much larger than that of the second coil 321 (the receiving coil), such that a single transmitting coil 311 may be electromagnetically coupled to a plurality of receiving coils 321, and power may be supplied to a plurality of loads connected to the plurality of receiving coils 321 through the single transmitting coil 311.

In another embodiment, an electrical apparatus comprises the above described wireless powering device, the first carrier on which the first coil assembly 310 of the wireless powering device is mounted, and the second carrier on which the second coil assembly 320 of the wireless powering device is mounted. When the second carrier is moved relative to the first carrier, the second coil 321 is moved relative to the first coil 311 in a direction S1,S2 perpendicular to the direction B of magnetic lines generated by the first coil 311. The electrical apparatus, in various embodiments, may be any type of electrical apparatus, such as a refrigerator, a washer, an air conditioner, or the like.

What is claimed is:

1. A wireless powering device, comprising:
    a first coil assembly including a first coil; and
    a second coil assembly including:
        a second coil adapted to be electromagnetically coupled with the first coil, one of the first coil and the second coil is used as a transmitting coil and another of the first coil and the second coil is used as a receiving coil, the second coil is movable with respect to the first coil in a direction perpendicular to a direction of magnetic lines generated by the transmitting coil; and
        a magnetic core formed as a frame and including a pair of opposing longitudinal side walls and an end side wall disposed at a first end of the longitudinal side walls, the second coil wound around the end side wall.

2. The wireless powering device of claim 1, wherein, when the second coil is moved relative to the first coil, a central axis of the receiving coil is parallel to the direction of the magnetic lines generated by the transmitting coil.

3. The wireless powering device of claim 1, wherein the magnetic core is formed as a rectangular frame and having an opening on a second end of the longitudinal side walls opposite the first end.

4. The wireless powering device of claim 3, wherein the first coil is formed as a frame in a predetermined shape, a side wall of the first coil is introduced into an inner space of the magnetic core via the opening and the second coil is disposed in an inner space of the first coil.

5. The wireless powering device of claim 4, wherein the first coil is a rectangular frame and the second coil is movable with respect to the first coil in a first direction parallel to a longitudinal direction of the first coil.

6. The wireless powering device of claim 1, wherein the first coil is formed as an L-shaped or an inverted L-shaped frame and includes a first portion extending in a first direction and a second portion extending in a second direction generally perpendicular to the first direction.

7. The wireless powering device of claim 6, wherein the second coil is movable relative to the first coil in the first direction or the second direction.

8. The wireless powering device of claim 1, wherein the first coil assembly includes a plurality of first coils each having a rectangular shape, the first coils forming a coil array having a predetermined shape.

9. The wireless powering device of claim 8, wherein the magnetic core is formed as a rectangular frame and having an end opening opposite the end wall.

10. The wireless powering device of claim 9, wherein the coil array passes through the end opening of the magnetic core such that the second coil assembly is movable along the coil array.

11. The wireless powering device of claim 10, wherein the magnetic core includes a pair of flat plate portions disposed at a second end of the longitudinal side walls opposite the first end.

12. The wireless powering device of claim 11, wherein the end opening is disposed between the pair of flat plate portions, the pair of flat plate portions have a width larger than that of the pair of longitudinal side walls to increase a coupling area with the first coil.

13. The wireless powering device of claim 12, wherein the coil array is formed as an L-shape or an inverted L-shape and includes a first portion extending in a first direction and a second portion extending in a second direction generally perpendicular to the first direction, the second coil is movable relative to the coil array in the first direction or the second direction.

14. A wireless powering device, comprising:
a first coil assembly including a plurality of first coils, the first coils forming a coil array having a predetermined shape, wherein a pair of adjacent first coils in the coil array are partially overlapped with each other to ensure a continuous transition between the adjacent first coils; and
a second coil assembly including a second coil adapted to be electromagnetically coupled with the first coil, one of the first coil and the second coil is used as a transmitting coil and another of the first coil and the second coil is used as a receiving coil, the second coil is movable with respect to the first coil in a direction perpendicular to a direction of magnetic lines generated by the transmitting coil.

15. The wireless powering device of claim 1, further comprising a single transmitting coil capable of electromagnetically coupling with a plurality of receiving coils.

16. A wireless powering device, comprising:
a first coil assembly including a first coil; and
a second coil assembly including:
a second coil adapted to be electromagnetically coupled with the first coil, one of the first coil and the second coil is used as a transmitting coil and another of the first coil and the second coil is used as a receiving coil, the second coil is movable with respect to the first coil in a direction perpendicular to a direction of magnetic lines generated by the transmitting coil; and
a magnetic core formed as a frame and including a pair of longitudinal side walls, an end side wall disposed at a first end of the longitudinal side walls, and a pair of flat plate portions disposed at a second end of the longitudinal side walls opposite the first end.

17. The wireless powering device of claim 16, wherein the magnetic core is formed as a rectangular frame and having an end opening, the second coil is wound around the end side wall of the magnetic core, wherein the first coil assembly passes through the end opening of the magnetic core such that the second coil assembly is movable along the first coil assembly.

18. The wireless powering device of claim 17, wherein the end opening is disposed between the pair of flat plate portions, the pair of flat plate portions have a width larger than that of the pair of longitudinal side walls to increase a coupling area with the first coil.

19. The wireless powering device of claim 16, wherein the first coil assembly includes a plurality of first coils, the first coils forming a coil array having a predetermined shape, wherein a pair of adjacent first coils in the coil array are partially overlapped with each other to ensure a continuous transition between the adjacent first coils.

\* \* \* \* \*